(12) United States Patent
Chandaria

(10) Patent No.: US 8,577,335 B2
(45) Date of Patent: Nov. 5, 2013

(54) METHOD AND APPARATUS FOR TRACKING PACKAGE DELIVERIES

(75) Inventor: Kapoor Chandaria, Nairobi (KE)

(73) Assignee: Kitaru Innovations Inc., Lascelles, St. James (BB)

(*) Notice: Subject to any disclaimer, the term of this patent is extended or adjusted under 35 U.S.C. 154(b) by 62 days.

(21) Appl. No.: 13/285,298

(22) Filed: Oct. 31, 2011

(65) Prior Publication Data

US 2012/0315955 A1    Dec. 13, 2012

Related U.S. Application Data

(60) Provisional application No. 61/494,556, filed on Jun. 8, 2011.

(51) Int. Cl.
*H04M 1/66* (2006.01)
*H04K 3/00* (2006.01)

(52) U.S. Cl.
USPC .......................................... 455/410; 455/41.3

(58) Field of Classification Search
USPC ............. 455/41.1–41.3, 410, 414.1; 340/10.1
See application file for complete search history.

(56) References Cited

U.S. PATENT DOCUMENTS

| 7,301,460 B2 | 11/2007 | Coste |
| 2005/0225445 A1 | 10/2005 | Petersen et al. |
| 2008/0147423 A1* | 6/2008 | Braun et al. ............... 705/1 |

FOREIGN PATENT DOCUMENTS

| CA | 2152835 | 1/1996 |
| CA | 2296647 | 7/2000 |
| CA | 2440434 | 3/2004 |
| CA | 2665389 | 5/2008 |
| WO | 2006055543 | 5/2006 |
| WO | 2010069345 | 6/2010 |

OTHER PUBLICATIONS

"2011 Mobile Barcode Promotion—FAQs" (United States Postal Service, May 20, 2011), online: <http://www.webletter.org/i/FAQsMobileBarcodePromotion.pdf>.
Carlos Macia, "Who Needs QR Codes?", (Address Vision, Apr. 23, 2012), online: AVI—mailScan <http://www.avimobile.net/whitepapers/Who%20Needs%20QR%20Codes.pdf>.

* cited by examiner

*Primary Examiner* — Lee Nguyen
(74) *Attorney, Agent, or Firm* — Sand & Sebolt

(57) ABSTRACT

A system and method for verifying receipt of a postal mail item mailed by a sender of the postal mail item is presented. A method reads postal information from a postal mail item that identifies the postal mail item. The postal information is combined with identification information that identifies the recipient of the postal mail item. The postal information and the identification information are sent to the sender of the postal mail item.

21 Claims, 2 Drawing Sheets

METHOD AND APPARATUS FOR TRACKING PACKAGE DELIVERIES

CROSS-REFERENCE TO RELATED APPLICATION

This application claims priority from U.S. Provisional Application Ser. No. 61/494,556, filed Jun. 8, 2011, the disclosure of which is incorporated herein by reference.

BACKGROUND OF THE INVENTION

1. Field of Invention

The current invention relates generally to apparatus, systems and methods for processing mail. More particularly, the apparatus, systems and methods relate to determining when mail has been delivered. Specifically, the apparatus, systems and methods provide for determining when a specific addressee receives a particular letter or package.

2. Description of Related Art

The physical delivery of packages or envelopes through traditional means (traditional government postal service, courier or similar legacy delivery methods) can be fraught with issues and subject to fraud or misuse. This issue is particularly serious when related to the delivery of critical information, sensitive documents, financial instruments, credit cards, or documents with personally identifiable information (PII), such as driver licenses, passports, permits, etc. Packages, letters and missives carried by conventional postal delivery services or courier services rely on labor intensive methods to ensure parcels or letters are delivered to the intended recipient.

While the identity of the individual receiving or picking up a parcel or envelope can be established by traditional means (i.e. using proof of identity, such as a driver's license at the point of delivery or pickup), this is often time and labor intensive and is an error prone method, and furthermore, it cannot establish when the package was actually opened or by whom. Establishing when a package was actually opened is nearly impossible using traditional methods.

When packages or envelopes go missing, either due to intentional or unintentional actions, the process of tracking and tracing, and establishing the actual location of such items is very time consuming and a cause of customer dissatisfaction. When items are stolen, intentionally delayed or hidden from view, it is virtually impossible to determine the location, routing or chain of custody for such items.

In addition, the collection of critical information to permit process analysis, performance, establish chain of custody, or correlation event between the time of issue and receipt depends on the collection of information from manual processes (such as physical signature capture or bar code scanning) and compilation of information from multiple sources, making it very difficult, if not impossible, to gather real or near real time information of end to end package or envelope delivery processes. Therefore, there is a desire to know when an actual addressee has received a letter, parcel, package or the like.

SUMMARY OF THE INVENTION

The preferred embodiment of the invention includes a method for verifying receipt of a postal mail item mailed by a sender of the postal mail item. The method reads postal information from a postal mail item that identifies the postal mail item. The postal information is combined with identification information that identifies the recipient of the postal mail item. Then the postal information and the identification information are sent to the sender of the postal mail item.

In one configuration of the preferred embodiment, the method uses a cellular phone to read postal information from the postal mail item. The identification information can be associated with a cellular telephone and can be a cellular phone number associated with the owner of the cellular phone.

In another configuration of the preferred embodiment, the reading information about the postal mail item includes reading the information about the postal mail item with a mobile telephone using near field communications (NFC). The information about the postal mail item is read from an RFID attached to the postal item. The information about the postal item may be read automatically or it must be initiated. For example, the mobile telephone can be configured or set up to automatically read the RFID and to automatically transmit information is combined with identification information that identifies the recipient back to the sender of the postal mail item. In a manual configuration, the owner of the mobile telephone would need to initiate that the mobile phone read the RFID and/or to initial the sending of a message back to the sender of the postal mail item.

Yet another configuration of the preferred embodiment includes activating an RFID in the postal mail item so that the RFID can be read. The activating of the RFID can be performed by a wireless device.

Another configuration of the preferred embodiment is a system for verifying receipt of a postal item that was mailed by a sender of the postal mail item. The system includes a read logic, an identification logic and a communications logic. The read logic reads information associated with a postal item from the postal item. In one configuration, the read logic can read the information associated with the postal item from an RFID tag associated with the postal item. The identification logic is configured to identify a person receiving the postal item as the recipient person. In one configuration, the identification logic can identify the person receiving the postal item by determining a telephone number associated with the person. The communication logic communicates to the sender that the postal item has been received by the recipient person.

In another configuration of this system, the read logic is configured to wirelessly read the information associated with the postal item. The identification logic can retrieve a digital identification associated with the person receiving the postal item and the communication logic transmits the digital identification to the sender of the postal item. The read logic, identification logic and communication logic can be integrated into a cellular telephone.

One objective of the invention is to overcome at least some of the drawbacks relating to the process of establishing the location, routing, actual time and location of receipt, and opening of a package or envelope.

Another objective of the invention is to establish the identity of the person opening the package or envelope by means of a device virtually every human being carries or will soon carry: a smart-phone, tablet PC or similar wireless device, with the ability to securely establish the user's identity, as well as the location of the device using GPS or other available triangulation methods.

Yet another objective of the invention is to provide automated methods to analyze processes related to the delivery, receipt and opening of the package or envelope, to provide critical business intelligence and analytics information that can help improve processes, streamline operations, automatically trigger billing based on timely delivery, etc.

Still yet another objective of the invention is to provide a method to automatically identify instances of potential fraud, unlawful re-routing or intentional delays in the delivery of packages or envelopes by means of automated alarms and notifications triggered by events outside of norm, as detected by either location/ID/date/time scans outside of an established norm, or lack of reporting within pre-established parameters.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
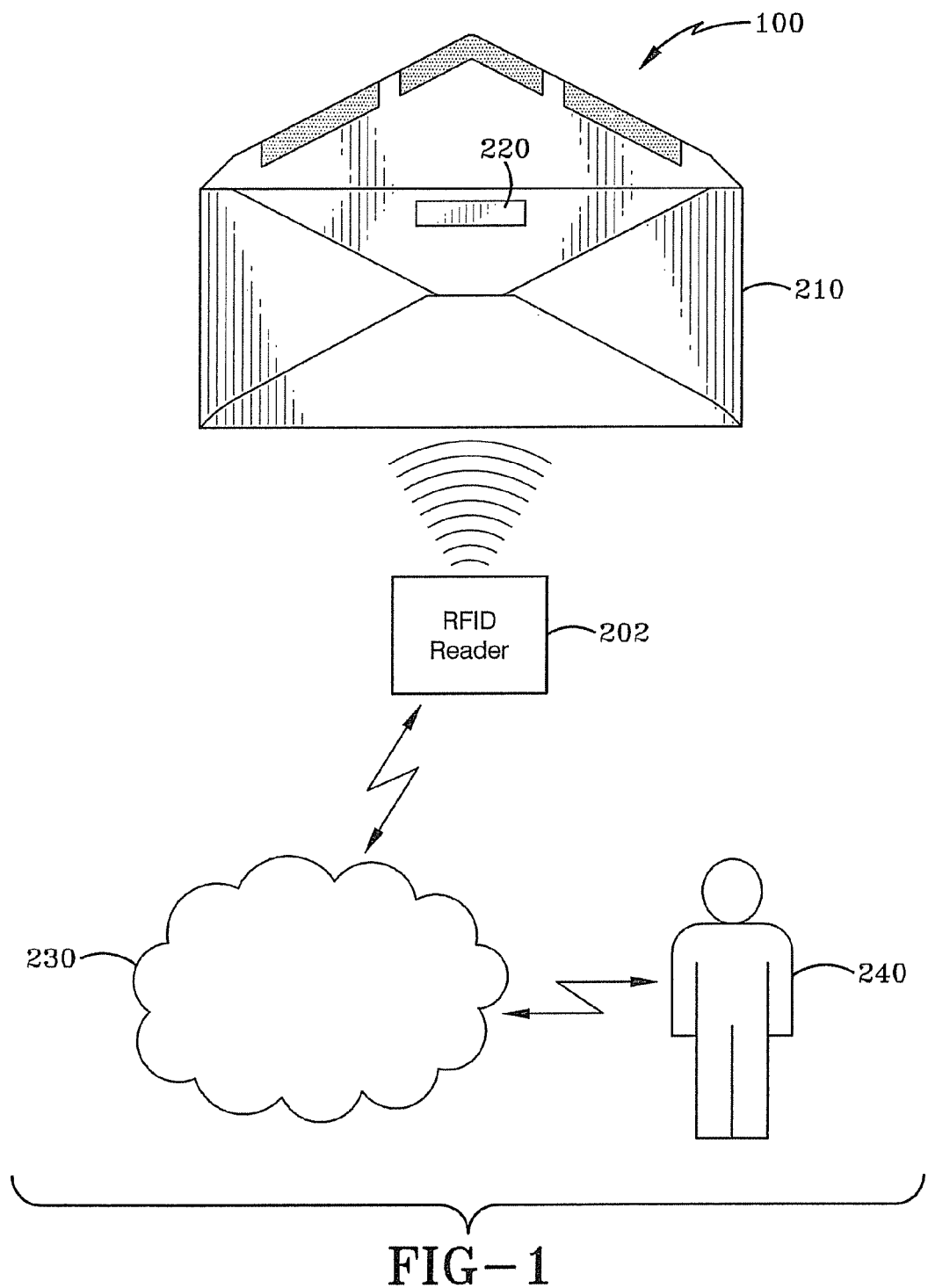
FIG. 1 illustrates a preferred embodiment of a system for verifying receipt of a postal item that was mailed by a sender of the postal item.

FIG. 1 illustrates the preferred embodiment of a system 100 for verifying receipt of a postal item 210 that was mailed by a sender 240 of the postal item 210. In the preferred embodiment, a person 240 or business mailing a postal item such as a letter 210, package, parcel or the like would attach a radio frequency identification (RFID) tag 220 to the mail item 210 while packaging the item 210. The RFID tag would be written (programmed) with data associated with the sender 240 of the letter such as the sender's email address, telephone number, the date the letter 210 was mailed and the like. The letter 210 eventually reaches its destination recipient.

When the letter 210 is received a reader 202 will read the RFID tag 220 to extract the information about the sender 240 and the letter 210. The reader 202 can be an RFID reader. The reader 202 can be set up and configured to automatically read the RFID tag 220 or it can be configured to wait until the recipient of the letter 210 prompts the reader 202 to read the RFID tag 220. The RFID tag 220 can be self activated and require very little energy to activate or can be activated by a small battery attached to the RFID tag 220. The RFID tag 220 can be activated by using a small amount of energy supplied by a near field communication (NFC) device that is located in a device such as a cell phone.

After the reader 202 has read the RFID tag 220, information about the sender is known allowing the reader 202 to then generate a message reporting the time that the letter was received back to the sender 240. For example, the reader 202 may be a NFC device located in the cellular phone of the recipient and the reader 202 can read the RFID tag 220 and transmit a text message into a network 230 or network cloud for transmission to the sender 240 or a database managed by the sender. Again, the reader 202 can be set up to automatically generate and transmit this message or it can be configured to wait until it is prompted to read the RFID tag 220 and/or also prompted to send this message.

The system of verifying receipt of a postal item 100 shown in FIG. 1 provides a low cost way for the sender to actually know that a postal item has been received by a recipient. Certain products are time sensitive and require a sender to know whether the recipient has received the postal item 210 or not and also the time it was received. In general, medicine/prescriptions and credit cards are often time sensitive and of such a value that their sender desires to know when these products arrive at the recipient that they were intended for. In the case of medicine, the patient may run out of medicine and could die if their medicine supply ran too low and eventually was exhausted.

Figure 2:
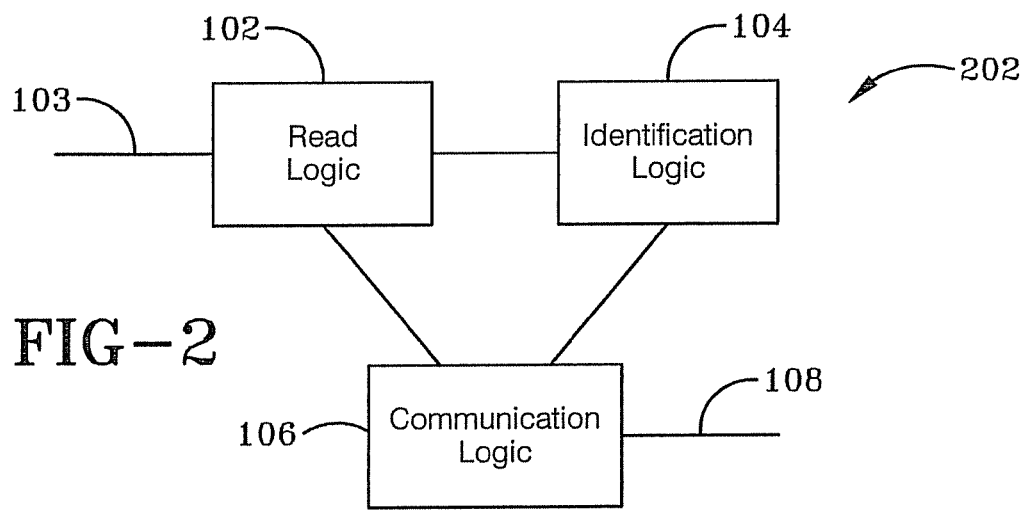
FIG. 2 illustrates an embodiment of a reader that can read data from the postal item.

FIG. 2 illustrates logic that can be included in the reader 202 of FIG. 1. The reader 202 includes read logic 102, identification logic 104 and communication logic 106. "Logic," as used herein, includes but is not limited to hardware, firmware, software and/or combinations of each to perform a function (s) or an action(s), and/or to cause a function or action from another logic, method, and/or system. For example, based on a desired application or need, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

In the preferred embodiment, the read logic 102 reads information associated with a postal item from the postal item. As previously mentioned, the read logic 102 can be a NFC RFID reading type of device implemented in a smartphone that reads RFID tags. The read logic 102 can also be implemented in a tablet computer, iphone, Blackberry, Android and other types of electronic devices. Also, as mentioned earlier, the read logic can be configured to automatically read the read information associated with the postal item or it can be configured to wait for a prompt before beginning that reading.

The identification logic 104 identifies the person receiving the postal item as the recipient person. For example, when the read logic 102 is implemented in a cellular phone, logic in the phone can extract a phone number identifying the owner of the phone. The communication logic 106 can then generate a message indicating the post item has arrived and transmit that message back to its sender along with the telephone number of the recipient, time of arrival and other information.

In one configuration of the preferred embodiment, the sender can write a phone number of the intended recipient of the mail item 210 into the RFID tag 220. The read logic 102 can then read (either automatically or when prompted) that phone number out of the RFID tag 220 when the mail item is received by the recipient. The identification logic 104 extracts a phone number that belongs to a person receiving the mail item 210 out of an electronic device such as cell phone that is carried by the recipient. The identification logic 104 then compares the phone number of the recipient to the phone number extracted from the RFID tag. If the two numbers match, the indented recipient received the mail item 210 and the communication logic 106 sends a message indicating this is sent to the sender 240 of the mail item 210. If the phone numbers do not match then the intended recipient did not actually receive the mail item 210 and the communication logic 106 sends a message indicating this is sent to the sender 240 of the mail item 210. Again, this sending can be automatic by the communication logic 106 or the communication logic 106 can be configured to require prompting to send this message. Alternatively, the system 100 may generate an alarm indicating this to the sender 240 or other personnel.

In another configuration of the preferred embodiment, the RFID tag 220 can periodically be read by various RFID readers along its route of travel and at each location it is read, it can be sent data about that location, time at that location, and other data to a database specified on the RFID tag 220 by the sender. When the mail item 210 has taken too long to reach its recipient or has deviated from a desired route of travel, this periodic location information can be extracted from the database and its route of travel reconstructed in an effort to locate the mail item 210. Alternatively, attempts can be made to locate the mail item 210 by triangulating the RFID tag 220 or using a GPS system to locate the RFID tag 220. In one configuration of the preferred embodiment, an automatic detection can be made that the mail item 210 has been opened and a reply message to the sender of the mail item 210 will automatically be generated and sent.

Another configuration of the preferred embodiment can be used to alert the sender of possible opening of the mail item 210 before it reaches the recipient. Conductive tape, conductive ink, printed ink or another conductive material can be deposited inside the mail item 210 so that conductive path(s) can be wrapped around the inside of the mail item 210 in a way that the mail item 210 cannot be opened without breaking the conductive path(s). When the conductive path(s) is cut, a status flag is set to indicate the mail item 210 was opened. The read logic 102 can read this status flag and the communication logic 106 can send an indication to the sender of the postal item 210 that it was opened before it reached the recipient when the status flag is set.

If the recipient of the mail item 210 does not confirm by the cell phone the receipt or does not use a cellular phone to confirm receipt then, the sender would know that the recipient is not the same person to whom the mail item 210 was addressed. Knowing this information allows a follow up contact to be made from the sender to the real recipient of the mail item 210 informing that the mail item 210 has not been opened by the real recipient. This also helps sender follow up the mail item 210 to prevent fraud in cases such as credit cards sent by mail.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
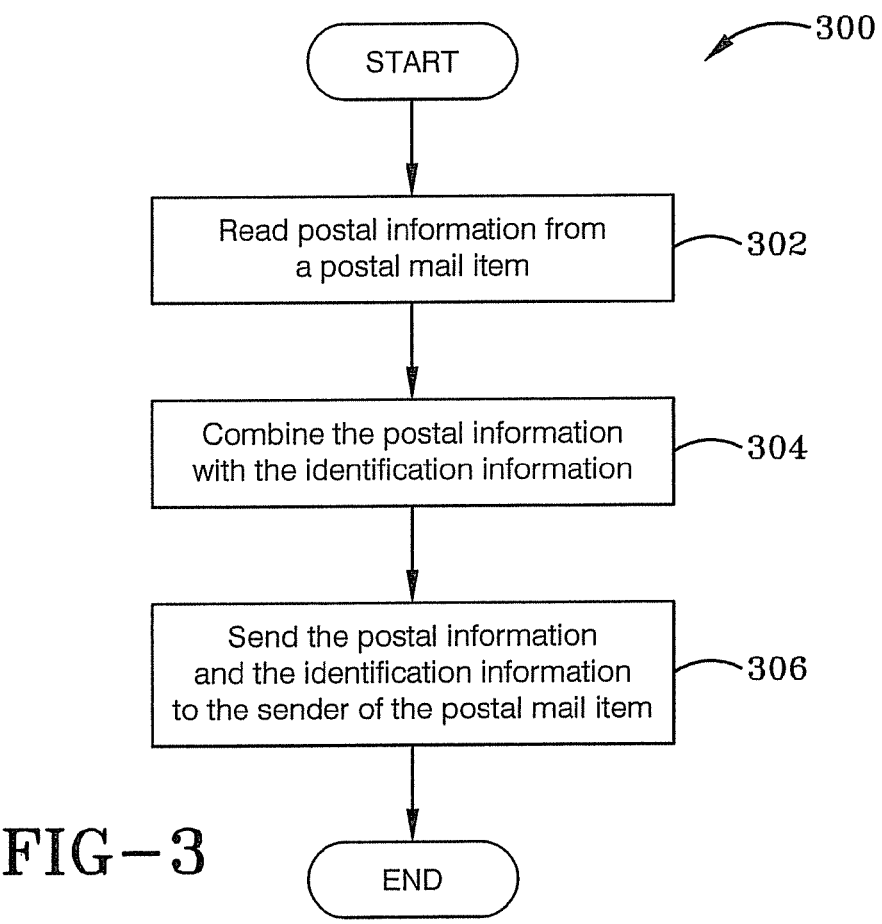
FIG. 3 illustrates an embodiment of a method for verifying receipt of a postal item that was mailed by a sender of the postal item.

FIG. 3 illustrates a method 300 of verifying receipt of a postal mail item mailed by a sender of the postal mail item. The method 300 begins by reading postal information, at 302, from a postal mail item that identifies the postal mail item. As previously discussed, the reader may be an RFID reader for reading information about the postal mail item from an RFID tag attached to the postal mail item. The reader may be an RFID reader located in a cellular telephone. The reading the information, at 302, can be performed utilizing a near field communication (NFC) environment generated by the mobile telephone.

The postal information is combined with identification information, at 304. The identification information identifies the recipient of the postal mail item. Also, as previously mentioned, the identification information can be a cellular telephone number of the recipient of the postal mail item. The postal information and the identification information is sent to the sender of the postal mail item to allow the sender to know that the person intended to receive the postal mail item has received it. Again the reading and sending can be automatic or a device performing the reading and sending can be configured to first wait for a read prompt and/or a send prompt before performing the reading and/or sending.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method for verifying receipt of a postal mail item mailed by a sender of the postal mail item comprising the steps of:

providing a device having a reader to a mail recipient, wherein the device is configured to read postal information that identifies the postal mail item;

the mail recipient receiving the postal mail item;

using the device to read postal information from the postal mail item by the mail recipient that identifies the postal mail item;

combining the postal information with identification information that identifies the mail recipient of the postal mail item;

sending the postal information and the identification information from the device to the sender upon receipt of the postal mail item; and leaving the postal mail item with the mail recipient.

2. The method of verifying receipt of a postal mail item of claim 1 wherein the step of reading postal information further comprises the step of:

reading information about the postal mail item from a radio frequency identification (RFID) tag attached to the postal mail item.

3. The method of verifying receipt of a postal mail item of claim 1 wherein the step of reading postal information further comprises the step of:

using a cellular phone to read postal information from the postal mail item.

4. The method of verifying receipt of a postal mail item of claim 1 further comprising the step of:

extracting the identification information from a cellular telephone.

5. The method of verifying receipt of a postal mail item of claim 4 wherein the step of extracting the identification information further comprises the step of:

extracting a telephone number associated with the mail recipient of the postal mail item from the cellular telephone.

6. The method of verifying receipt of a postal mail item of claim 1 wherein the step of reading information about the postal mail item further comprises the step of:

reading the information about the postal mail item by the mail recipient utilizing a near field communication (NEC) enabled mobile telephone.

7. The method of verifying receipt of a postal mail item of claim 1 further comprising the steps of:

determining whether the postal mail item has been opened;

when the postal mail item has been opened, setting a status flag;

wherein the step of reading postal information further comprises the step of:

reading if the status flag is set; and wherein the step of setting a status flag further comprises the step of:

sending an indication to the sender of the postal mail item that the package was opened before it reached the recipient when the status flag is set.

8. The method of claim 7, wherein the step of determining whether the postal mail item has been opened, further comprises the step of:

providing a conductive path in electrical communication with the mail item;

breaking the conductive path; and indicating the mail has been opened.

9. The method of verifying receipt of a postal mail item of claim 1 wherein the step of reading information about the postal mail item further comprises the step of:

reading information about the postal mail item using an electronic wireless device.

10. The method of verifying receipt of a postal mail item of claim 1 further comprising the step of:

activating a radio frequency identification (RFID) in the postal mail item by the sender, so that the RFID can be read by the device of the mail recipient.

11. The method of verifying receipt of a postal mail item of claim 10 wherein the step of activating the RFID is performed by a wireless device.

12. The method of verifying receipt of a postal mail item of claim 1 wherein the step of sending further comprises the step of:

sending the postal information and the identification information over at least a partially wireless network to the sender of the postal mail item.

13. The method of verifying receipt of a postal mail item of claim 1 further comprising the steps of:

storing information about the postal mail item and the sender of the postal mail item into an RFID; and attaching the RFID to the postal mail item.

14. The method of verifying receipt of a postal mail item of claim 13 further comprising the step of:

powering the RFID.

15. The method of verifying receipt of a postal mail item of claim 1 wherein the step of reading postal information further comprises the step of:

reading postal information from a memory in the RFID.

16. A system for verifying receipt of a mail item that was mailed by a sender of the mail item comprising:

a reader device in the possession of a recipient of the mail item, said device including read logic, identification logic, and communication logic;

said read logic configured to read information associated with a mail item from the mail item;

said identification logic configured to identify a person receiving the mail item as the recipient; and said communication logic configured to communicate from the recipient to the sender that the mail item has been received by the recipient.

17. The system for verifying receipt of a mail item of claim 16, wherein the identification logic is configured to identify the person receiving the mail item by determining a telephone number associated with person.

18. The system for verifying receipt of a mail item of claim 16, wherein the read logic is configured to read the information associated with the mail item from and RFID tag associated with the mail item.

19. The system for verifying receipt of a mail item of claim 16, wherein the read logic is configured to wirelessly read the information associated with the mail item.

20. The system for verifying receipt of a mail item of claim 16, wherein the identification logic is configured to retrieve a digital identification associated with the person receiving the mail item and the communication logic is configured to transmit the digital identification to the sender of the mail item.

21. The system for verifying receipt of a mail item of claim 16, wherein the read logic, identification logic and communication logic are integrated in a cellular telephone.

* * * * *

UNITED STATES PATENT AND TRADEMARK OFFICE
CERTIFICATE OF CORRECTION

PATENT NO. : 8,577,335 B2
APPLICATION NO. : 13/285298
DATED : November 5, 2013
INVENTOR(S) : Kapoor Chandaria Page 1 of 1

It is certified that error appears in the above-identified patent and that said Letters Patent is hereby corrected as shown below:

In the Claims:

Column 7, lines 20-22 (Claim 6) change the phrase "reading the information about the postal mail item by the mail recipient utilizing a near field communication (NEC) enabled mobile telephone" to --reading the information about the postal mail item by the mail recipient utilizing a near field communication (NFC) enabled mobile telephone--

Signed and Sealed this
Seventh Day of January, 2014

Margaret A. Focarino
*Commissioner for Patents of the United States Patent and Trademark Office*